Patented Oct. 1, 1940

2,216,251

UNITED STATES PATENT OFFICE 2,216,251

SILICATE-CONTAINING PRODUCT AND PROCESS FOR MAKING IT

Sverre Quisling, Madison, Wis.

No Drawing. Application June 16, 1938,
Serial No. 214,043

10 Claims. (Cl. 106—30)

This invention relates to silicate-containing products and processes for making them and is herein illustrated as applied to products made with sodium silicate or water glass.

This application is a continuation in part of my copending application bearing the same title, Serial No. 20,189 filed May 7, 1935, now Patent No. 2,152,917, wherein the desirable properties of products of sodium silicate having an alkali silicate ratio of 1:1.58 to 1:2 are further described and claimed.

Coatings of sodium silicate of the ratio 1:1.58 to 1:2 when not chemically treated or used in combination, become brittle on ageing, are often hygroscopic or efflorescent, lose their fire retardant properties quickly, seem to combine with lignin of wood and form a powder which comes off with the least friction, are very soluble in water, and do not cover well one coat over the other.

This invention provides a product which overcomes, at least partially, all these defects in silicate paints and in addition provides a product suitable for use as a strong adhesive, a thermoplastic, a superior fire retardant covering for combustible material, and a sound and heat insulator.

Sodium silicate concentrated solution of the ratio alkali to silicate 1:1.58 to 1:2 is precipitated easily with a crystalline product resulting unless certain physio-chemical procedures are observed. This in part characterizes my invention as well as the knowledge of what chemicals in the most suitable proportions are needed to produce a superior product.

I have found that perhaps the most stable and desirable products were obtained by use of the following ingredients in approximately the following proportions:

| | Parts |
|---|---|
| Sodium silicate concentrated solution | 82 |
| Boric acid (crystalline) | 1.5 |
| Protein (preferably zein) | 1.5 |
| Aromatic hydroxy compound (preferably phenol or pyrogallol) | 2 |
| Glycerol fatty acid ester (oils and fats) | 10 |
| Aluminum powder (metallic) | 2 |
| Fatty acid (preferably stearic acid) | 1 |

The method and order of adding each of the above ingredients one to the other is very important for definite physical-chemical reasons. Be it sufficient to say that unless the general procedure outlined below is followed, a useless, fragile, crystalline precipitate often results.

The sodium silicate used was of an alkali to silicate ratio 1:1.58 to 1:2 in the concentration supplied in liquid form to Industry termed 59 to 69 Baumé. To about 80 to 85 parts of such sodium silicate solution was added 1 to 2 parts of powdered boric acid and the mixture stirred until it appeared homogeneous. To this mixture 1 to 2 parts of protein, preferably zein in powdered form was added and the resulting mixture again stirred until it appeared homogeneous. It was found that other proteins could be used instead of zein, including casein in powdered form or as obtained in buttermilk, egg albumen fresh or as obtained commercially in powdered form, or blood albumen. After separately dissolving 1 to 2 parts aromatic hydroxy compound including at least one of the group phenol, cresol, resorcinol, pyrogallol, and guiacol in a solution including an organic solvent such as acetone or diethylene oxide, or alcohol and then mixing this with 8 to 10 parts of glycerol ester of fatty acids, including at least one of the group animal fat in the form of lard, linseed oil, cotton seed oil, tungoil, sulfonated castor oil, sulfonated olive oil, and soybean oil. This mixture was slowly stirred into the above sodium silicate mixture. To this mixture was added 1 to 2 parts of metallic aluminum powder and the mixture heated on a water bath. A reaction apparently took place between the free alkali in the mixture and the metallic aluminum during which hydrogen gas was evolved. After continuing the heating for a short period and stirring, the reaction was completed and a homogeneous product resulted. To give this product less surface tension and thus greatly improve its wetting and adhesive qualities, 1 part of stearic or oleic acid was stirred into the mixture at this time. The addition of 1 part sodium fluoride to the product gave additional insecticide properties. To render the surface of a coating of the product more waterproof it was found that vinyl resin in a suitable solvent such as acetone or diethylene oxide formed a very adherent, glossy, waterproof coating. Oils, varnishes, cellulose lacquers, and phenol formaldehyde varnishes were also found to form a coating on the sodium silicate product and might thus be useful for protective or decorative purposes.

It was further found that variations in the proportions of the ingredients were possible as also it was possible to leave out or substitute one or more of the ingredients, but the products so obtained were seemingly of inferior quality in one or more properties to the preferred coating just described.

It was found that the use of fatty acids alone, preferably stearic acid without any glycerol esters of fatty acids in the product, seemed to greatly increase the adhesive strength quality of the product for use as a binding agent for wood, glass, plastics, metal and fabrics.

The properties of the product of my invention and how each as obtained by the method and order of addition of necessary ingredients follows:

Combustible materials such as wood, paper, and cloth have long been coated with sodium silicate for the purpose of fire proofing. This fire proofing property depends on the characteristic of this coating known as intumescence, that is, the property of puffing up with gas when heated. This property disappears on ageing, seldom lasting even 6 months after a coating is applied. To improve the art therefor one had to increase this property of intumescence and cause retention of this property on ageing. The first I found possible by adding protein such as zein, casein, egg albumen, and blood protein to the sodium silicate. This increased the thickness of the puffed up coat on heating from 2–3 times without protein to 6–15 times the original thickness with protein. By far the best results were obtained by using zein which was also more easily soluble in alkali silicate. Casein in the form of buttermilk proved next most valuable to zein. Protein further seemed to act as a binding agent, increased the flexibility, and prevented the surface of the sodium silicate paint from cracking, checking, or turning to powder when dry and aged. Only a small amount (from 1 to 2%) was necessary to accomplish excellent results. When zein was used it was found that the product could be rendered less water soluble by applying a dilute solution of acetic acid to the dry product. Zein forms a water insoluble film with acid. This property was further enhanced by using a coating solution including acetic acid, acetone, and linseed oil to the dried zein containing silicate film.

The method of testing my product to determine its superiority as a fire proof coating over the use of untreated sodium silicate and other products was to use the Standard fire tube test prescribed by the U. S. Forest Products Laboratory at Madison, Wisconsin, where commercial fire proof paints are tested by the United States Government. I made up a slightly modified apparatus and used wooden test sticks of similar size, texture, and weight. Then after weighing, coating, weighing again and drying, tested and compared the results using my coating with those of other so-called "fire proof" products. The time taken for an uncoated stick to completely burn up in my fire tube test apparatus was 35 seconds. The tendency for the coated stick to glow after testing was noted positive or negative. The U. S. Forest Products Laboratory test includes placing the stick in the fire tube for testing for 4 minutes and noting the total loss of weight. To be acceptable, coated sticks should not lose more than 25% of their weight and the coating should not weigh more than 25% of that of the stick, or about 20 grams to the square foot surface. Tests conducted on my product using protein in the sodium silicate coating product showed that I need 20% less coating to produce protection inducing at least 20% less loss of weight than requirements of the fire tube test. There was no glow on removing the coated test sticks from the flame of the fire tube thus showing absence of combustion.

Intumescence (the quality of the coating to puff up on heating) was noted even on portions of the coated stick which did not come in contact with the flame itself. Apparently this protected the stick from heated gases which otherwise might have caused combustion.

To render the sodium silicate coatings flexible and stable at least one of the group hydroxy-aromatics including phenol, cresol, resorcinol, guiacol, and pyrogallol were found very useful—especially phenol and pyrogallol. I have found that the addition of small amounts of at least one of these hydroxy-aromatics will render flexible a coating of sodium silicate of an alkali to silicate ratio of 1:1.58 to 1:2 when exposed to the atmosphere for a period of over 3 years. Excellent results in the product of this invention were obtained by using as little as 2% hydroxy-aromatics. This amount was easily incorporated in the sodium silicate mixture, seemingly combining with it. It decreased the water solubility of the product, as well as acted as a plasticizer to increase flexibility and preserve homogeneity.

Phenol used in these combinations made the final product colorless and transparent to slightly milky translucent. Pyrogallol gave the final product a dark brown stained wood appearance. Resorcinol and cresol gave the final product a slightly translucent cream colored appearance. Insoluble inert pigments in combination with resorcinol, cresol, phenol and guiacol gave many pleasing colors to the product without materially affecting other properties.

The addition of 1% by weight of boric acid, either in crystalline form or its equivalent in a 10% aqueous solution, rendered sodium silicate of the alkali silicate ratio 1:1.58 to 1:2 much less water soluble. This amount of boric acid also increased the rate of formation of a surface film on the coatings. It is possible that this was due to the combination of free alkali with the boric acid to form sodium borate which is relatively less water soluble. This reduction of the free alkali concentration perhaps also may have acted to decrease solubility by further decreasing the solubility of the silica of the product.

When larger amounts (best observed in 8% concentration) of boric acid were added to the sodium silicate and a hydroxy aromatic and dissolved by heating to the boiling point—a product was formed which was found to be thermo-labile. This product upon the addition of 1% of protein, preferably zein, formed a flexible smooth coating which would soften on heating and harden on cooling.

To further reduce the alkalinity and render the product less water soluble powdered metallic aluminum was tried in combination with concentrated solutions of sodium silicate of an alkali silicate ratio of from 1:1.58 to 1:2. A reaction occurred between the free alkali and the aluminum apparently as follows:

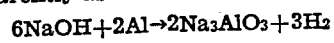

If too large an amount of metallic aluminum was added the reaction resulted in the formation of a relatively insoluble grainy or crystalline mass of $Na_3AlO_3$ and $SiO_2$ having no useful plastic or paint-like properties. However in the amount of 1% metallic powdered aluminum by weight to the amount of concentrated sodium silicate solution a useful paint-like product was produced. Best results were obtained using a sodium silicate solution of an alkali to silicate ratio of about 1:2 and 59 Baumé with 1% by weight of metallic powdered aluminum. This was heated on a water bath with constant stirring until the evolution of hydrogen ceased. This took on an average about 15 minutes. A uniform homogeneous product having paint-like consistency resulted, the dried film of which was characterized by decreased water solubility. No precipitate of silica occurred when such small amounts of aluminum were used.

When metallic aluminum powder was incorporated into the sodium silicate paint just before applying it as a coating, the coating was found to undergo a delayed intermescent-like reaction, i. e. the reaction took place slowly and the coating puffed up with hydrogen gas bubbles sometime after being applied. The puffed up hardened film thus obtained was found to have excellent sound proofing and heat insulating qualities. This film was found to be most desirable if it incorporated protein, aromatic hydroxy compound, boric acid, and stearic acid before the addition of the metallic aluminum. Practically it should be feasible to paint this product either by brush or by a spray gun onto surfaces for fire proofing, heat insulating, and sound insulating just after having added the metallic aluminum powder. The reaction would then take place slowly over a period of several hours and a puffed up film result.

To further decrease the water solubility and to obtain certain other valuable properties, fatty acids and glycerol esters of fatty acids in the form of animal fats and vegetable oils were tried with good results. Stearic acid used alone was particularly valuable. In the amount of about 1 percent it markedly decreased the water solubility of the product. Oleic acid was also used instead of stearic acid and found useful. However the most valuable property resulting from the addition of stearic acid to the sodium silicate, powdered metallic aluminum, boric acid, protein, hydroxy aromatic mixture was the lowering of surface tension. This permitted increased ease of coverage one coat over the other so difficult when using most silicate paint combinations. It also made a product which served as a strong adhesive for wood, metal, plastics, glass and fabric. Stearic acid was most effectively incorporated into the product as a final step. Adding it at this time avoided the possibility of getting a frothy final product in preparing paint mixtures. By using stearic acid in the silicate paints of my invention, more uniform coatings were possible.

Vegetable oils including linseed oil, tung oil, cotton seed oil, castor oil, olive oil, soybean oil, sulfonated olive oil, sulfonated castor oil, hydrogenated cotton seed oil, and also animal fats in the form of lard—were all tried in combination with sodium silicate, boric acid, aromatic hydroxy compound, aluminum and protein mixtures with resultant decreased solubility of the final product. It was further found that the oils and fats served as excellent means for introducing the aromatic hydroxy compounds quickly and uniformly into sodium silicate solutions. Thus an aromatic hydroxy compound was mixed with an equal amount of an organic solvent and this mixture of aromatic hydroxy compound was added to about 8 times its weight of oil. The best results were obtained using phenol or pyrogallol in acetone or diethylene oxide mixed with cotton seed oil, tung oil, or lard. Such glycerol esters of fatty acids were mixed with the sodium silicate, boric acid, protein mixtures and seemed to form homogeneous products. To such products about 1 percent metallic aluminum by weight was added and the mixtures stirred and heated on a water bath. The oil or lard apparently saponified due to the presence of alkali on the application of heat and a homogeneous, relatively poorly water soluble product resulted. This property was probably partly due to the formation of a relatively water insoluble aluminum soap.

The use of glycerol esters of fatty acids in the sodium silicate mixture gave the product some valuable, unique additional properties. Among the most valuable was the decreased time of drying due to a peculiar thermo-labile property. The product hardened on cooling but could be softened for use by heating to about 212° F. on a water bath. The hardened product in thin coatings was flexible and resilient and showed no tendency to crack, powder, or peal after prolonged ageing. Cloth and paper treated with the product could be warmed and shaped up to retain any form desired on cooling.

Products containing glycerol esters of fatty acids in a sodium silicate mixture were found to have increased properties of intermescence thus markedly increasing their value for fire proofing. Perhaps the additional increased flexibility of the coatings of these later products was partly responsible for their ability to puff up more on heating.

It would seem that saponification played some part in the glycerol esters of fatty acids giving new properties to my product, because the use of mineral oil produced no such results. One might apparently assume fatty acids, animal fats, and vegetable oils used in my invention form a definite combination in my preferred product.

These latter products could be brought to any desired consistency on heating and by the addition of the proper amount of hot water. The product covered well and hardened almost as soon as applied. Smooth, uniform coatings resulted which adhered well to the test sticks.

No offensive odors resulted from the hydroxy aromatics in the presence of the glycerol esters of fatty acids. If desired a rather pleasant odor could be given to any of the products described by the addition of small amounts of benzaldehyde without materially altering their desirable properties.

I found that the addition of sodium fluoride as an insecticide in amounts up to 1 percent did not materially alter my final product. This addition might prove valuable when a combination insecticide, plus fire proofing, and sound and heat insulating product is desirable for use in coating the inside of walls, floors, and roofing of buildings.

The description of my invention covers several thousand tests using experimental combinations. It has been found that numerous modified products can be made, but my results can only be duplicated by following the general procedure outlined, and using the type of ingredients outlined.

The development of a new thermo-labile product having more stable and increased fire proofing properties together with the sound and heat insulation value is my most unique contribution to the art. It is understood that modifications of procedure using ordinary mechanical or chemical skill in producing the product, or by using variations in the exact amounts of ingredients does not constitute invention over the art of my invention as defined by the claims.

Having thus described my invention what I claim is:

1. The process of obtaining a reaction product of sodium silicate and aluminum comprising the addition of not more than 2 per cent of finely divided metallic aluminum to a concentrated aqueous sodium silicate solution having an alkali to silicate ratio of not less than 1 to 2 and containing a plasticizer comprising a hydroxy-aromatic compound.

2. The process of obtaining an intumescent reaction product of sodium silicate and aluminum comprising the addition of not more than 2 per cent of finely divided metallic aluminum to a concentrated aqueous sodium silicate solution having an alkali to silicate ratio of not less than 1 to 2 and containing a plasticizer comprising a hydroxy-aromatic compound selected from the group consisting of phenol, cresol, resorcinol, guiacol, and pyrogallol.

3. The intumescent compositions of matter comprising, the reaction products of not more than 2% metallic aluminum, with mixture containing concentrated aqueous sodium silicate solution having an alkali to silicate ratio of at least 1 part alkali to 2 parts silicate and plasticized with an hydroxy-aromatic compound.

4. The compositions of matter comprising, the reaction products of not more than 2% metallic aluminum, with mixtures containing a major portion of concentrated aqueous sodium silicate having an alkali to silicate ratio of at least 1 part alkali to 2 parts silicate plasticized with a hydroxy-aromatic compound.

5. The compositions of matter comprising, the reaction products of not more than 2% metallic aluminum, with mixtures containing concentrated aqueous sodium silicate having an alkali to silicate ratio of at least 1 part alkali to 2 parts silicate plasticized with a hydroxy-aromatic compound selected from the group consisting of phenol, cresol, resorcinol, guiacol, and pyrogallol.

6. The compositions of matter comprising, the reaction products of not more than 2% metallic aluminum, with mixtures containing concentrated aqueous sodium silicate having an alkali to silicate ratio of at least 1 part alkali to 2 parts silicate plasticized with a hydroxy-aromatic compound selected from the group consisting of phenol, cresol, resorcinol, guiacol, and pyrogallol in an organic solvent.

7. The compositions of matter comprising, the reaction products of not more than 2% metallic aluminum, with mixtures containing concentrated aqueous sodium silicate having an alkali to silicate ratio of at least 1 part alkali to 2 parts silicate plasticized with a hydroxy-aromatic compound selected from the group consisting of phenol, cresol, resorcinol, guiacol, and pyrogallol in an organic solvent containing a glycerol fatty ester.

8. The compositions of matter comprising, the reaction products of not more than 2% metallic aluminum, with mixtures containing concentrated aqueous sodium silicate having an alkali to silicate ratio of at least 1 part alkali to 2 parts silicate plasticized with a hydroxy-aromatic compound selected from the group consisting of phenol, cresol, resorcinol, guiacol, and pyrogallol in an organic solvent containing a glycerol fatty ester and containing a protein.

9. The compositions of matter comprising, the reaction products of not more than 2% metallic aluminum, with mixtures containing concentrated aqueous sodium silicate having an alkali to silicate ratio of at least 1 part alkali to 2 parts silicate, plasticized with a hydroxy-aromatic compound selected from the group consisting of phenol, cresol, resorcinal, guiacol, and pyrogallol in an organic solvent containing a glycerol fatty ester and containing a protein and boric acid.

10. The process of obtaining amorphous reaction products using aluminum with mixtures containing sodium silicate comprising, the addition of between 1% and 2% finely divided metallic aluminum, with a cencentrated aqueous sodium silicate solution having an alkali to silicate ratio of not less than 1 to 2 containing a plasticizer.

SVERRE QUISLING.